(12) United States Patent
Ganguly

(10) Patent No.: US 12,456,061 B2
(45) Date of Patent: Oct. 28, 2025

(54) SELF-MONITORING COGNITIVE BIAS MITIGATOR IN PREDICTIVE SYSTEMS

(71) Applicant: International Business Machines Corporation, Armonk, NY (US)

(72) Inventor: Debasis Ganguly, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1024 days.

(21) Appl. No.: 17/132,786

(22) Filed: Dec. 23, 2020

(65) Prior Publication Data
US 2022/0198297 A1 Jun. 23, 2022

(51) Int. Cl.
*G06N 5/04* (2023.01)
*G06N 20/00* (2019.01)

(52) U.S. Cl.
CPC ............ *G06N 5/04* (2013.01); *G06N 20/00* (2019.01)

(58) Field of Classification Search
CPC ............ G06N 5/04; G06N 20/00; G06N 3/08
See application file for complete search history.

(56) References Cited

U.S. PATENT DOCUMENTS

| 10,275,877 | B2 | 4/2019 | Reicher et al. |
| 10,593,220 | B2 | 3/2020 | Joseph et al. |
| 2018/0357557 | A1 | 12/2018 | Williams et al. |
| 2019/0180358 | A1* | 6/2019 | Nandan ............... G06F 18/2113 |
| 2020/0285939 | A1* | 9/2020 | Baker ..................... G06N 3/045 |
| 2021/0174222 | A1* | 6/2021 | Dodwell ................ G06N 5/04 |
| 2022/0012591 | A1* | 1/2022 | Dalli ....................... G06N 3/082 |
| 2022/0108222 | A1* | 4/2022 | Brannon ............... G06N 20/00 |

OTHER PUBLICATIONS

Wang, M. et al., "Racial Faces in the Wild: Reducing Racial Bias by Information Maximization Adaptation Network", https://openaccess.thecvf.com/content_ICCV_2019/html/Wang_Racial_Faces_in_the_Wild_Reducing_Racial_Bias_by_Information_ICCV_2019_paper.html (Year: 2019).*

Meyerson, E. et al., "Pseudo-task Augmentation: From Deep Multitask Learning to Intratask Sharing—and Back", https://arxiv.org/abs/1803.04062 (Year: 2018).*

(Continued)

*Primary Examiner* — Alexey Shmatov
*Assistant Examiner* — Devika S Maharaj
(74) *Attorney, Agent, or Firm* — Amin, Turocy & Watson, LLP

(57) ABSTRACT

One or more embodiments described herein facilitate identification and mitigation of cognitive bias in data-driven models. In one embodiment, a deep-learning system can comprise a memory that stores computer executable components; and a processor that executes the computer executable components stored in the memory. The computer executable components can comprise: an input component that receives data comprising primary task labels, secondary-identity attributes and a number of potential categories for one or more of the secondary-identity attributes; a machine-learning model that generates one or more predictions based on the received data; and a multi-objective learning component that trains the machine-learning model to mitigate bias from the one or more predictions.

20 Claims, 13 Drawing Sheets

(56) References Cited

OTHER PUBLICATIONS

Farooq et al., "Artificial Intelligence based Smart Diagnosis of Alzheimer's Disease and Mild Cognitive Impairment," International Smart cities conference, 2017, 4 pages.

Trinh et al., "A pedestrian path-planning model in accordance with obstacle's danger with reinforcement learning," arXiv:1912.02945, 2019, 6 pages.

Das et al., "Knowledge-augmented col. Networks: Guiding Deep Learning with Advice," arXiv:1906.01432v1 [cs.LG], 2019, 7 pages.

Patankar et al., "Bias Discovery in News Articles Using Word Vectors," 16th IEEE International Conference on Machine Learning and Applications, 2017, 4 pages.

Wenskovitch et al., "The Effect of Semantic Interaction on Foraging in Text Analysis," IEEE Conference on Visual Analytics Science and Technology, 2018, 12 pages.

Das, "Human-Allied Efficient and Effective Learning in Noisy Domains," Dissertation, 2019, 208 pages.

Bolukbasi et al., "Man is to Computer Programmer as Woman is to Homemaker? Debiasing Word Embeddings," In Proc. of NIPS, arXiv:1607.06520v1 [cs.CL], 2016, 25 pages.

Zafar et al., "Fairness beyond disparate treatment : Learning classification without disparate mistreatment," In Proc. of WWW, arXiv:1610.08452v2 [stat.ML], 2017, 10 pages.

Beutel et al., "Data Decisions and Theoretical Implications when Adversarially Learning Fair Representations," FAT/ML, arXiv:1707.00075v2 [cs.LG], 2017, 5 pages.

Kamiran et al., "Classifying without Discriminating," International Conference on Computer, Control and Communication, 2009, 7 pages.

Yenala et al., "Deep learning for detecting inappropriate content in text," International Journal of Data Science and Analytics, 2018, 14 pages.

Robinson, "Filtering inappropriate content with the Cloud Vision API," https://cloud.google.com/blog/products/gcp/filtering-inappropriate-content-with-the-cloud-vision-api, Aug. 17, 2016, 8 pages.

Anonymous, "Learning to be Fair: A Self-Retrospective Multi-Objective Approach," 8 pages.

Sen et al., "Towards Socially Responsible AI: Cognitive Bias-Aware Multi-Objective Learning," Association for the Advancement of Artificial Intelligence, 2020, 8 pages.

\* cited by examiner

SELF-MONITORING COGNITIVE BIAS MITIGATOR IN PREDICTIVE SYSTEMS

BACKGROUND

The embodiments described herein relate to artificial intelligence (AI)-based systems, and more specifically, to AI-based systems that facilitate identification and mitigation of cognitive bias in data-driven models.

AI-based systems, such as data-driven or Deep Learning Models, can currently be trained to perform many tasks such as identification or analysis. As AI-based systems become more sophisticated, they will likely become ever more prevalent, important, and influential to human society. However, existing data-driven models are susceptible to learning cognitive bias by learning incorrect associations. This cognitive bias can lead to AI-based systems making determinations based on mischaracterizations. This can lead to incorrect determinations by AI-based systems, reinforce humans' existing cognitive bias by point to AI results as proof positive of their held bias, or introduce new cognitive bias to humans in a similar way. Another problem with existing data-driven models is that bias within the model itself cannot be detected without the input of a predefined set of annotations for secondary-identity attributes. Another problem with existing data-driven models is that even if they are capable of identifying cognitive bias, they are unable to mitigate or remove the bias, limiting the usefulness of the models.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

According to one or more embodiments, a system is provided. The system can comprise a memory that stores computer executable components. The system can further comprise a processor that can be operably coupled to the memory and that can execute computer executable components stored in the memory. In various embodiments, the computer executed components can comprise an input component that receives data comprising primary task labels, secondary-identity attributes, and a number of potential categories for one or more of the secondary-identity attributes. In various embodiments, the computer executed components can further comprise a machine-learning model, that generates one or more predictions based on the received data. In various embodiments, the computer executed components can further comprise a multi-objective learning component that trains the machine-learning model to mitigate bias from the one or more predictions. An advantage of such a system is that it can both identify and mitigate bias from the one or more predictions generated by the machine-learning model, without the need of either human supervision or annotations for secondary-identity attributes.

In some embodiments, the system can further comprise an input subspace analyzer that clusters the data or abstract representations of the data from intermediate layers of the machine-learning model. An advantage of such a system is that it can both identify and mitigate bias from the predictions generated by a machine-learning model without the need of either human supervision or annotations for secondary-identity attributes.

According to another embodiment, a computer-implemented method can comprise receiving, via an input component operatively coupled to a processor, data comprising primary task labels, secondary-identity attributes and a number of potential categories for one or more of the secondary-identity attributes. The computer-implemented method can further comprise generating one or more predictions, via a machine-learning model operatively couple to the processor, based on the received data. The computer-implemented method can further comprise training, via a multi-objective learning component operatively coupled to the processor, the machine-learning model to mitigate bias from the one or more predictions. An advantage of such a computer-implemented method is that it can both identify and mitigate bias from the one or more predictions generated by the machine-learning model, without the need of either human supervision or annotations for secondary-identity attributes.

In some embodiments, the computer-implemented method can further comprise clustering, using an input subspace analyzer, the data or abstract representations of the data from intermediate layers of the machine-learning model. An advantage of such a computer-implemented method is that it can both identify and mitigate bias from the one or more predictions generated by the machine-learning model, without the need of either human supervision or annotations for secondary-identity attributes.

According to another embodiment, a computer product comprising a computer readable storage medium having program instructions embodied therewith, the program instructions executable by a processor to cause the processor to receive data comprising primary task labels, secondary-identity attributes, and a number of potential categories for one or more of the secondary-identity attributes. The program instructions are further executable by the processor to cause the processor to make predictions, using a machine-learning model, based on the received data. The program instructions are further executable by the processor to cause the processor to train, using a multi-objective learning component, the machine-learning model to mitigate bias from the predictions. An advantage of such a computer program product is that it can both identify and mitigate bias from the predictions generated by the machine-learning model, without the need of either human supervision or annotations for secondary-identity attributes.

In some embodiments, the program instructions are further executable by the processor to cause the processor to receive values of the second-identity attributes for a subset of the data. An advantage of such a computer program product is that it can both identify and mitigate bias from the predictions generated by the machine-learning model, without the need of either human supervision or annotations for secondary-identity attributes.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
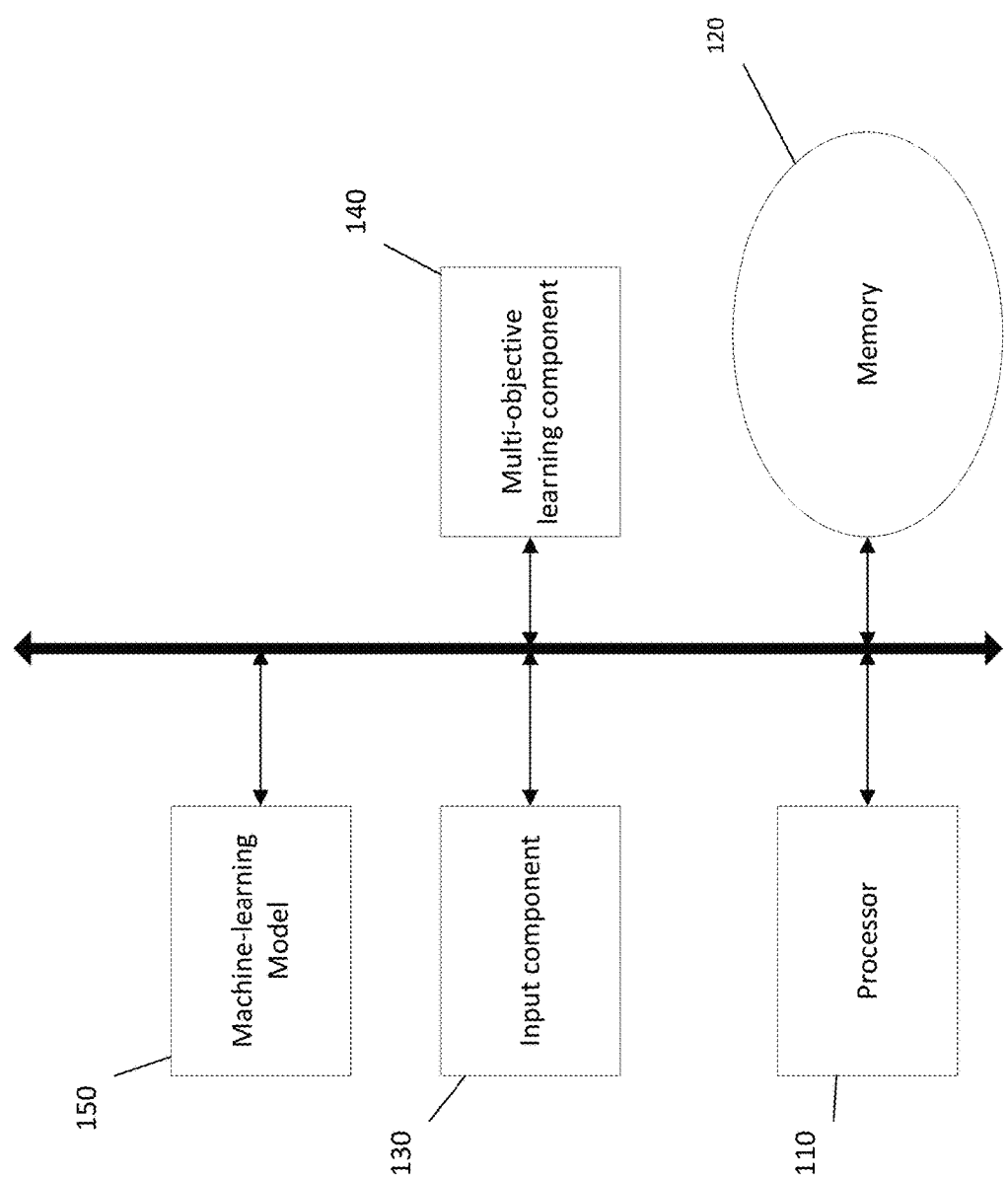
FIG. 1 illustrates a block diagram of an example, non-limiting system that facilitates mitigation of cognitive bias in data-driven AI in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be realized in practice without these specific details.

Data-driven AI or, deep learning, is a machine-learning technique that employs a training process associated with a network of learner units (e.g., processing units) to determine previously unknown features, classifications and/or patterns associated with data provided to the network of learner units. Deep learning is often employed in technical fields such as speech recognition, image recognition, graphical modeling and bioinformatics etc. Data provided to the network of learner units can include a training set (e.g., a set of data with known classifications that is employed for the training process) that is employed at a beginning of the training process. Utilizing the training set, the network of learner units can perform iterative processing stages in which data generated during a particular processing stage is determined from data generated during one or more previous processing stages.

Given the problems described above with existing deep learning and AI-based systems developing cognitive biases, the present disclosure can be implemented to produce a solution to these problems in the form of systems, computer-implemented methods, and/or computer program products that can facilitate both detection of cognitive bias within AI-based systems and the mitigation or elimination of the cognitive bias. An advantage of such systems, computer-implemented methods, and computer program products is that they can identify bias without the need of secondary-attribute annotations or strong human supervision. As an additional advantage, once bias is identified, such systems, computer-implemented methods, and computer program products can take action to mitigate or eliminate the bias.

Embodiments described herein include techniques to facilitate the identification and mitigation of cognitive biases in data-driven AI. For example, in one embodiment, an input component operatively coupled to a processor can receive a set of input data for the purpose of generating one or more predictions. In some embodiments, the set of input data can include primary task labels, secondary-identity attributes, and a number of potential categories for one or more of the secondary-identity attributes. In some embodiments, the input data can include primary task labels, secondary-identity attributes and a number of potential categories for the secondary-identity attributes. This input can then be used, by a machine-learning model operatively coupled to the processor, to generate one or more predictions assigning primary task labels. Due to the nature of machine-learning models, as described above, the predictions can be biased. If bias is present in the predictions, it can then be identified. Once identified, the machine-learning model can be trained, via a multi-objective learning component operatively coupled to the processer, to mitigate bias from the one or more predictions.

FIG. 1 illustrates a block diagram of an example, non-limiting system that facilitates mitigation of cognitive bias in data-driven AI in accordance with one or more embodiments described herein. With reference now to FIG. 1, there is illustrated an example system 100 that can mitigate cognitive bias within a data-driven AI. The system and/or components can be employed to use hardware and or software that are highly technical in nature, that are not abstract, and that cannot be performed as a set of mental acts by a human. In various embodiments, the system 100 can include a processor 110 and a memory 120 to facilitate operations, which can execute processes that cannot be performed by a human mind. Furthermore, the processor 110 and the memory 120 can process data at speeds and in amounts that cannot be matched by a human mind. In various embodiments, the input component 130, can receive data comprising primary task labels, secondary-identity attributes, and a number of potential categories for the secondary-identity attributes. For example, if the primary task was to determine the emotion of individuals, then the input component 130 could receive primary task labels such as "anger" or "fear", secondary-identity attributes such as "height" or "glasses or no glasses", and a number of potential categories for the secondary-identity attributes such as two for "height" ("tall" and "short") and two for "glasses or no glasses" ("glasses" and "no glasses").

After the input component 130 receives the input data, it can be fed to the machine-learning model 150 that generates predictions based on the input data. It is at this point that cognitive bias can appear in the one or more predictions generated by the machine-learning model 150. The one or more predictions can then be passed to the multi-objective learning component 140 that identifies the bias present in the one or more predictions and trains the machine-learning model 150 to mitigate bias from the one or more predictions.

The multi-objective learning component 140 can train the machine-learning model 150 by creating a set of pseudo-task variables. These pseudo-task variables can be used to set a "bias task" in the same way in which the primary task variables are used to train the machine-learning model 150 on the primary task. In effect, the machine-learning model 150 is then debiased by being taught to concurrently perform at a first level in a primary task and perform at a second level that is less than the first level in a pseudo-bias task.

In an embodiment, pseudo-task variables can be set as Boolean variables. The pseudo-task variables can denote a frequency association, $y_i^B$ that can then be determined using the function:

$$y_i^B(x) = \begin{cases} 1, & \frac{\mathbb{1}(y(x) \in P_s \wedge z_i \in U_i)}{\mathbb{1}(y(x) \in P_s)} > \tau \\ 0, & \text{otherwise} \end{cases}$$

where in $P_s$ is a category for which bias needs to be removed, $z_i$ is a particular category of a secondary-identity attribute, $U_i$ is a set of under-represented categories within $C_i$, $C_i$ is the set of categories of the $i^{th}$ secondary-identity attribute, and where $\tau \in [0, 1]$.

Once pseudo-task variables have been set, then the multi-objective learning component 140 can train the machine-learning model 150. This can be achieved by employing the following multi-objective loss function:

$$\mathcal{L} = P(y \mid x; \Theta_p, \Theta_s) - \sum_{i=1}^{n} P(y_i^B \mid x; \Theta_i^B, \Theta_s),$$

which learns to perform above a first threshold on a primary task and perform below a second threshold (note the − sign in the second half of the function) on a pseudo-bias task. In various embodiments, the performance is effective based on a determination that the likelihood is maximized and/or the performance is poor based on an inverse determination that the likelihood is maximized. In another embodiment, the performance is effective based on a determination that the likelihood is at or above a defined threshold. In effect, the multi-objective learning component 140 trains the machine-learning model 150 to do well in the primary task while at the same time doing poorly in the pseudo-bias task (this is evident from the minus sign outside the summation of the likelihood components for bias). The pseudo-bias task can also be described in the opposite as a fairness task, where doing poorly in the pseudo-bias task can be described as doing well in the fairness task.

Figure 2:
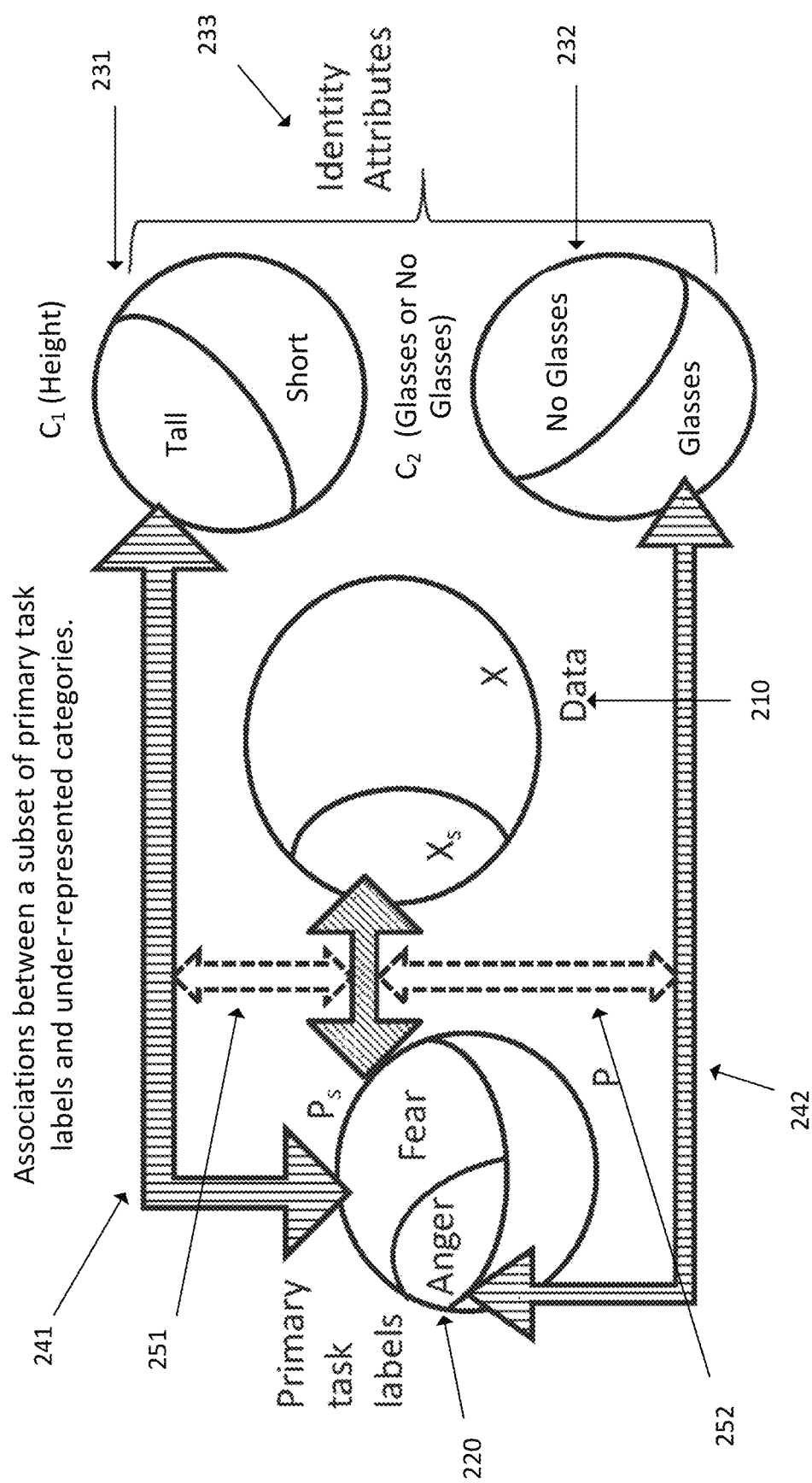
FIG. 2 illustrates a non-limiting a schematic for the setting of pseudo-task variables in accordance with one or more embodiments described herein.

With respect now to FIG. 2 a schematic for the setting of pseudo-task variables is provided. Data 210 represents the input data that is received by the system. This data 210 is then used by a machine-learning model 150 to make predictions assigning primary task labels 220. In the present example, the primary task labels 220 can have one of two values: "fear" or "anger". One or more secondary-identity attributes 233 are attributes for which pseudo-task variables are typically defined. In the present example secondary-identity attribute 231 and secondary identity attribute 232 are defined as "height" and "glasses or no glasses" respectively. Co-occurrences 241-242 of specific values of the secondary-identity attributes 233 with prediction categories of primary task labels 220 are then observed. In this example, the co-occurrences 241 between the "height" value of "tall" and the primary task value of "fear" is shown. Similarly, the co-occurrences 242 between the "glasses or no glasses" of "glasses" and the primary task value of "anger" are shown. These co-occurrences 241-242 between specific values of the secondary-identity attributes 233 with prediction categories of primary task labels 220 are then used to learn the association between input data, primary task labels, and a secondary-identity attribute value. As such, association 251 can represent the association between the "height" value of "tall" and the primary task label of "fear". Likewise, association 252 represents the association between the "glasses or no glasses" value of "glasses" and the primary task label value of "anger". These associations 251-252 can then be used to determine the value of a pseudo-task variable by examining if an association is particularly strong or weak or by a function, such as the one described above.

Figure 3:
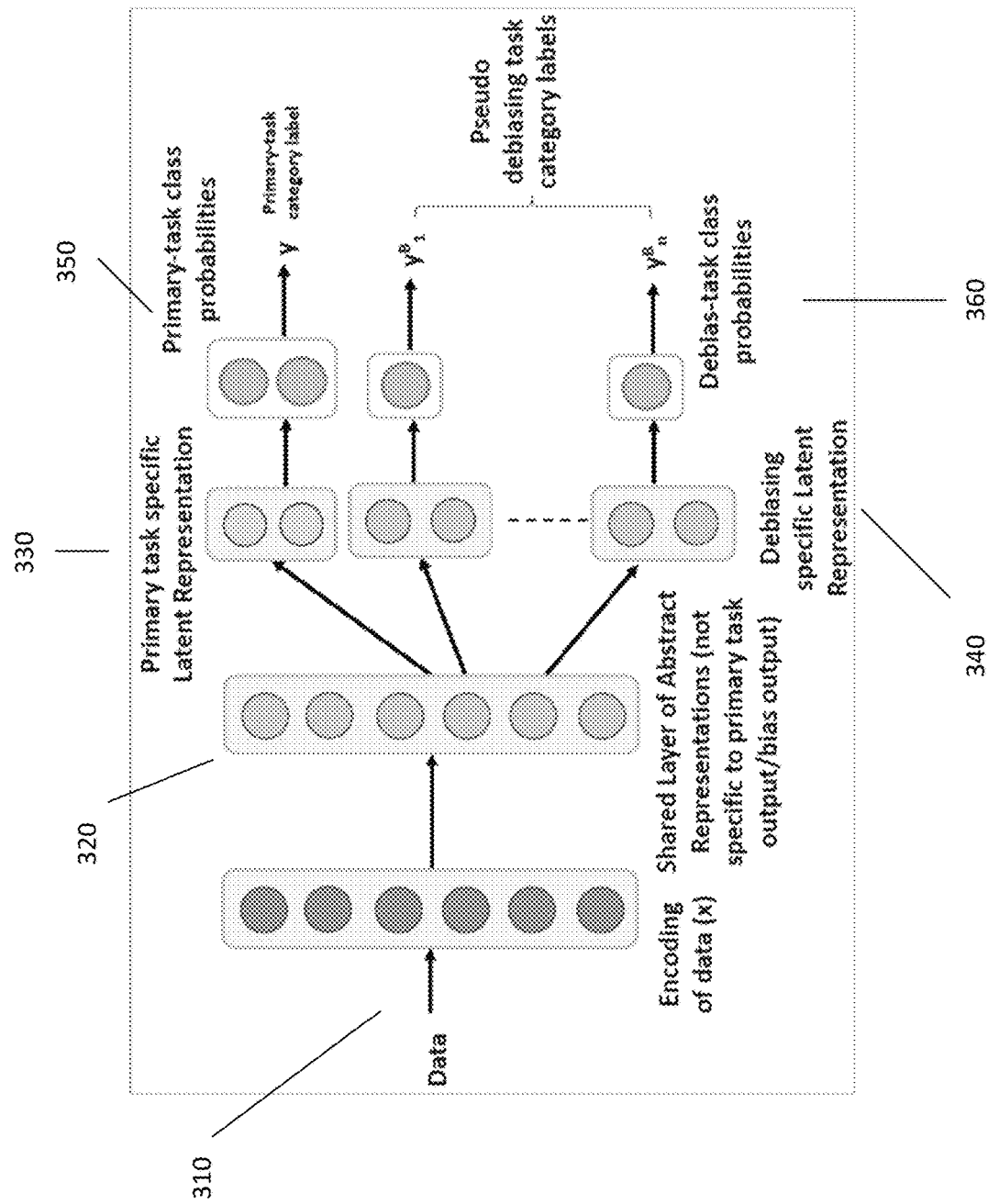
FIG. 3 illustrates a non-limiting schematic diagram of a neural network architecture for jointly learning to perform at a first level in a primary task and perform at a second level that is less than the first level in a pseudo-bias task in accordance with one or more embodiments described herein.

Turning now to FIG. 3, a schematic diagram is provided of a neural network architecture 300 for jointly learning to perform well in a primary task and poorly in a pseudo-bias task. Data 310 is received from the machine-learning model 150. The data 310 is used to create a shared layer of abstract representations 320, which is not specific to primary task output or bias output. The shared layer of abstract representations 320 is then split into subsections comprising a primary task specific latent representation 330 and one or more debiasing specific latent representations 340. Primary-task class probabilities 350 assign primary-task category labels. Similarly, debias-task class probabilities 360 assign debiasing task category labels. In an embodiment, a neural network architecture such as this can be implemented by the multi-objective learning component 140.

Figure 4:
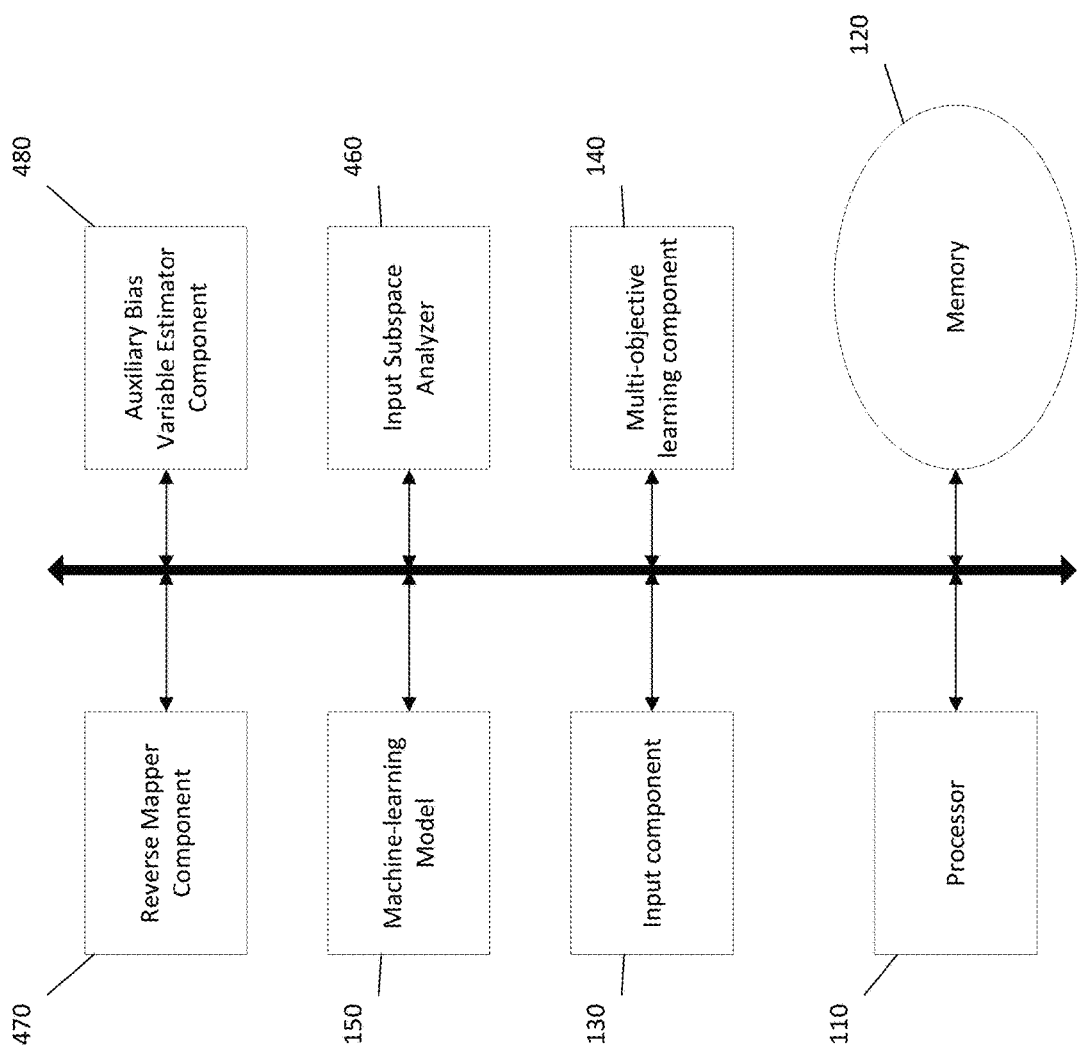
FIG. 4 illustrates a block diagram of an example, non-limiting system that facilitates mitigation of cognitive bias in data-driven AI in accordance with one or more embodiments described herein.

In another embodiment, additional components can be included in the system in order to better identify and mitigate bias. FIG. 4 illustrates a block diagram of an example, non-limiting system that facilitates mitigation of cognitive bias in data-driven AI in accordance with one or more embodiments described herein.

With reference now to FIG. 4, there is illustrated an example of system 400 that can mitigate bias within a data-driven AI. In various embodiments, the system 400 can include the components present in system 100 described above. Furthermore, system 400 can include an input subspace analyzer 460. This input subspace analyzer 460 can cluster the data or abstract representations of the data from intermediate layers of the machine-learning model 150.

In an embodiment, the input subspace analyzer 460 can create K clusters where K=the possible number of combinations of different secondary-identity attribute categories. For example, if there were two categories for "height" and two for "glasses or no glasses", then K=4. This clustering can be achieved by a number of approaches, such as but not limited to, the implementation of the density-based spatial clustering of applications with noise (DBSCAN). In another embodiment, clustering can be restricted to a subspace of the data. For example, explanation-based techniques, such as LIME, Shap, or L2X can be applied to estimate a subset of the secondary-identity attribute weights, and then restrict clustering only to the subspace of the secondary-identity attribute most important to the primary task, thus saving overhead and improving efficiency by limiting the amount of clustering employed.

Returning now to FIG. 4, an auxiliary bias variable estimator component 480 can also be integrated into the system 400. The auxiliary bias variable estimator component 480 can selectively turn on or off a set of pseudo-task variables as a function of non-uniformity in distribution of the clusters. The variables can be used to define a bias or fairness task in the same way in which the primary task variables do. These pseudo-task variables can then be fed into the multi-objective learning component 140. In system 400, a reverse mapper component 470 is included, which can map a subset of the predictions to the clusters in order to assist the auxiliary bias variable estimator component 480 in determining whether to set the pseudo-task variables. In an embodiment, the auxiliary bias variable estimator component 480 can compute the posteriors of the clusters, assuming that the clusters corresponds to a particular attribute value combination (or that, in some embodiments, one or more clusters correspond to a particular attribute value combination). The reverse mapper component 470 can then help determine if a prediction, generated by the machine-learning model 150, is biased by mapping the prediction to a cluster. In an embodiment, the reverse mapper component 470 can also be reinforced with extrinsic data. This extrinsic data could include a suggestion of which of the clusters should be considered for setting pseudo-task variables based on additional input. The extrinsic data could also serve as a set of bias examples to facilitate the system 400 associating prediction classes with at least one of the clusters.

Figure 5:
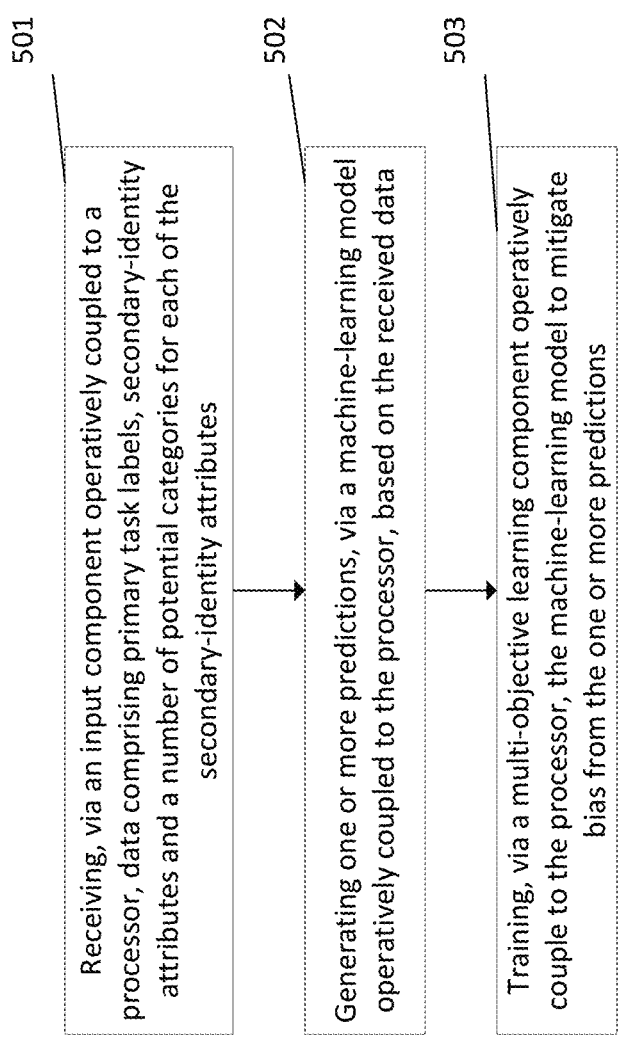
FIG. 5 illustrates a flow diagram of an example, non-limiting computer-implemented method that facilitates the mitigation of cognitive bias within a predictive system in accordance with one or more embodiments described herein.

Turning now to FIG. 5, presented is a flow diagram of a computer implemented method 500 that employs a processor operatively coupled to a memory that stores computer executable components to perform acts that facilitate the identification and mitigation of cognitive bias within an AI-based system in accordance with one or more embodiment described herein.

At 501, a system operatively coupled to a processor receives (e.g., via input component 130 operatively coupled to a processor 110) data comprising primary task labels 220, secondary-identity attributes 233, and a number of potential categories for the secondary-identity attributes. At 502, the system generates one or more predictions (e.g., via machine-learning model 150 operatively coupled to a processor 110) based on the received data. At 503, the system trains (e.g., via a multi-objective learning component 140 operatively coupled to a processor 110) the machine-learning model 150 to mitigate bias from predictions.

Figure 6:
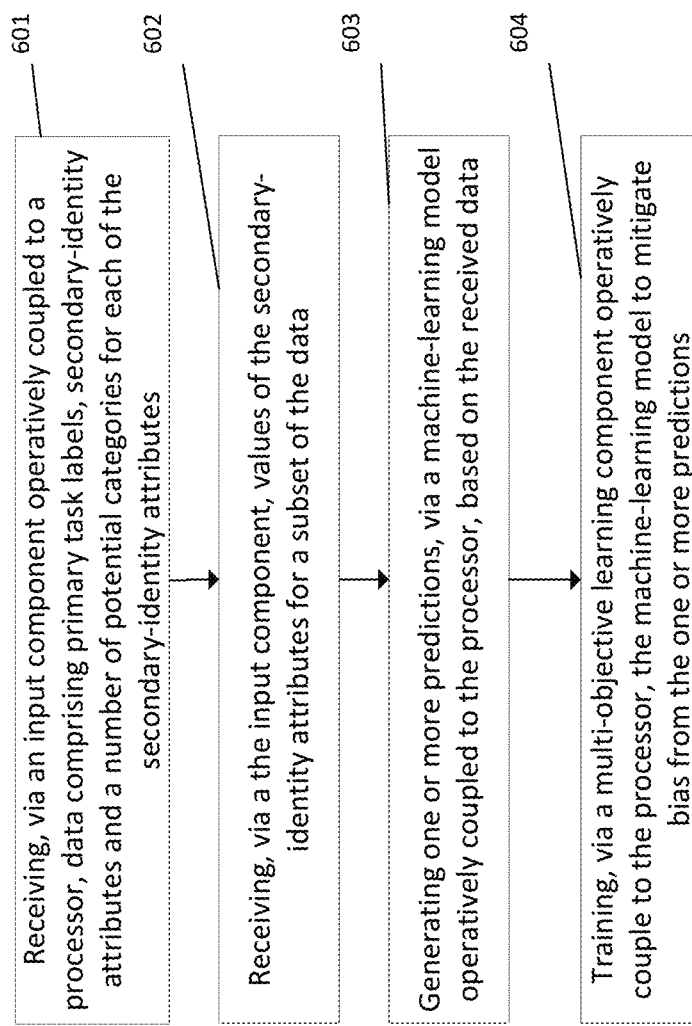
FIG. 6 illustrates a flow diagram of an example, non-limiting computer-implemented method that facilitates the mitigation of cognitive bias within a predictive system in accordance with one or more embodiments described herein.

Turning now to FIG. 6, presented is a flow diagram of a computer implemented method 600 that employs a processor operatively coupled to a memory that stores computer executable components to perform acts that facilitate the identification and mitigation of cognitive bias within an AI-based system in accordance with one or more embodiment described herein.

At 601, a system operatively coupled to a processor receives (e.g., via input component 130 operatively coupled to a processor 110) data comprising primary task labels 220, secondary-identity attributes 233 and a number of potential categories for the secondary-identity attributes. At 602, the system receives (e.g., via input component 130 operatively coupled to a processor 110) secondary-identity attribute values for a subset of the data. At 603, the system generates one or more predictions (e.g., via machine-learning model 150 operatively coupled to a processor 110) based on the received data. At 604, the system trains (e.g., via a multi-objective learning component 140 operatively coupled to a processor 110) the machine-learning model 150 to mitigate bias from predictions.

Figure 7:
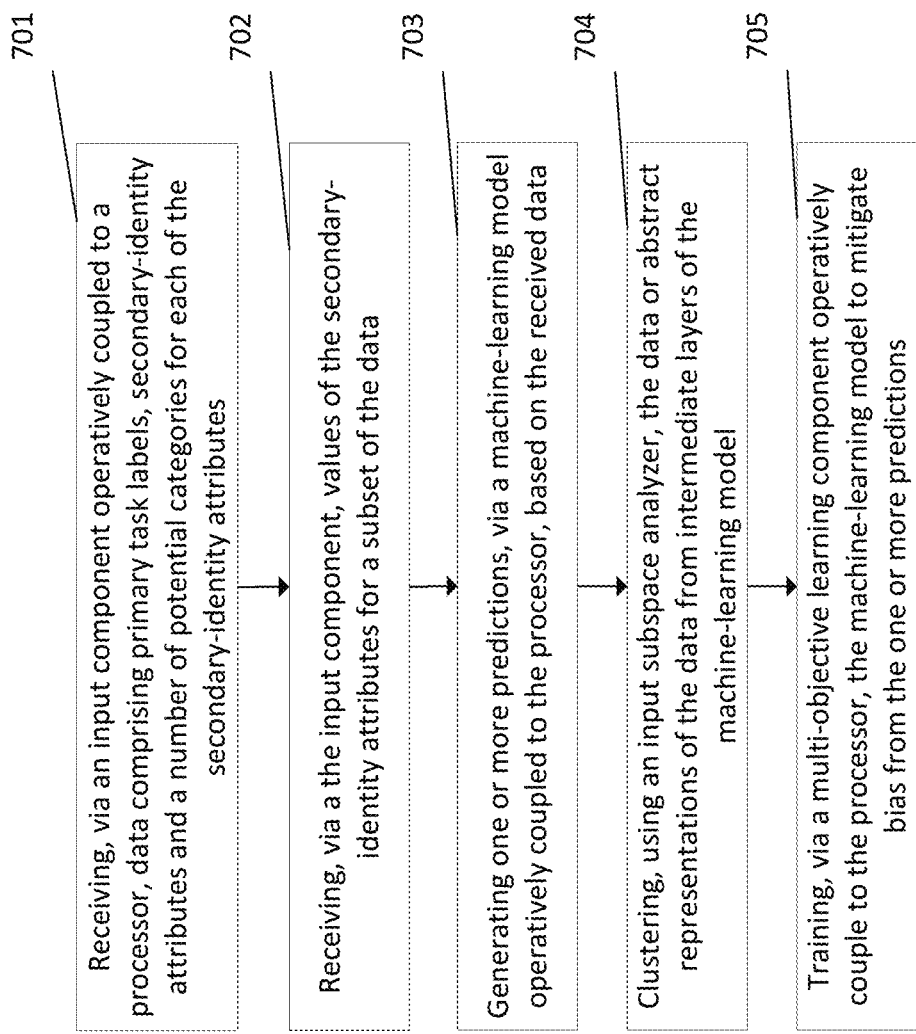
FIG. 7 illustrates a flow diagram of an example, non-limiting computer-implemented method that facilitates the mitigation of cognitive bias within a predictive system in accordance with one or more embodiments described herein.

Turning now to FIG. 7, presented is a flow diagram of a computer implemented method 700 that employs a processor operatively coupled to a memory that stores computer executable components to perform acts that facilitate the identification and mitigation of cognitive bias within an AI-based system in accordance with one or more embodiment described herein.

At 701, a system operatively coupled to a processor receives (e.g., via input component 130 operatively coupled to a processor 110) data comprising primary task labels 220, secondary-identity attributes 233 and a number of potential categories for the secondary-identity attributes. At 702, the system receives (e.g., via input component 130 operatively coupled to a processor 110) secondary-identity attribute values for a subset of the data. At 703, the system generates one or more predictions (e.g., via machine-learning model 150 operatively coupled to a processor 110) based on the received data. At 704, the system clusters (e.g., via input subspace analyzer 460 operatively coupled to a processor 110) the data or abstract representations of the data. At 705, the system trains (e.g., via a multi-objective learning component 140 operatively coupled to a processor 110) the machine-learning model 150 to mitigate bias from predictions.

Figure 8:
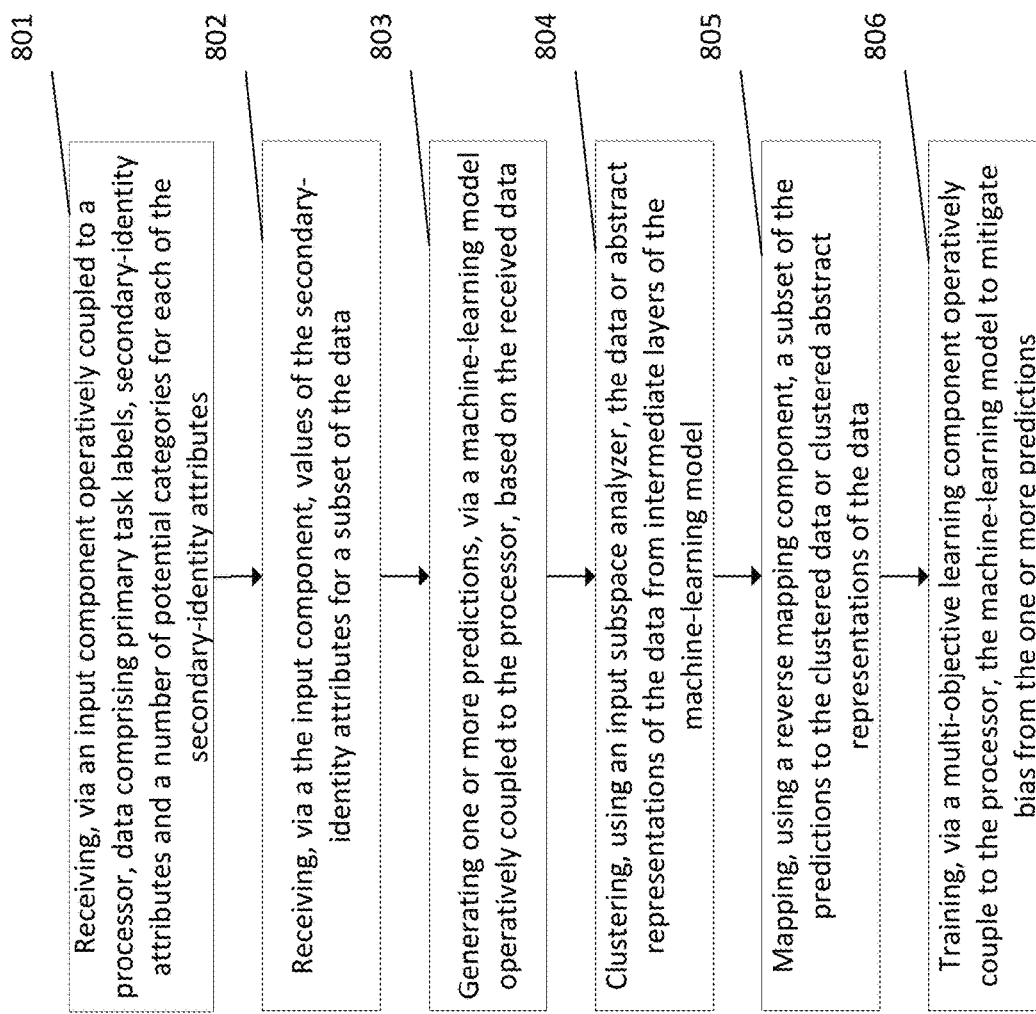
FIG. 8 illustrates a flow diagram of an example, non-limiting computer-implemented method that facilitates the mitigation of cognitive bias within a predictive system in accordance with one or more embodiments described herein.

Turning now to FIG. 8, presented is a flow diagram of a computer implemented method 800 that employs a processor operatively coupled to a memory that stores computer executable components to perform acts that facilitate the identification and mitigation of cognitive bias within an AI-based system in accordance with one or more embodiment described herein.

At 801, a system operatively coupled to a processor receives (e.g., via input component 130 operatively coupled to a processor 110) data comprising primary task labels 220, secondary-identity attributes 233 and a number of potential categories for the secondary-identity attributes. At 802, the system receives (e.g., via input component 130 operatively coupled to a processor 110) secondary-identity attribute values for a subset of the data. At 803, the system generates one or more predictions (e.g., via machine-learning model 150 operatively coupled to a processor 110) based on the received data. At 804, the system clusters (e.g., via input subspace analyzer 460 operatively coupled to a processor 110) the data or abstract representations of the data. At 805, the system maps (e.g., via reverse mapper component 470 operatively coupled to a processor 110) a subset of the predictions to the clustered data or clustered abstract representations of the data. At 806, the system trains (e.g., via a multi-objective learning component 140 operatively coupled to a processor 110) the machine-learning model 150 to mitigate bias from predictions.

Figure 9:
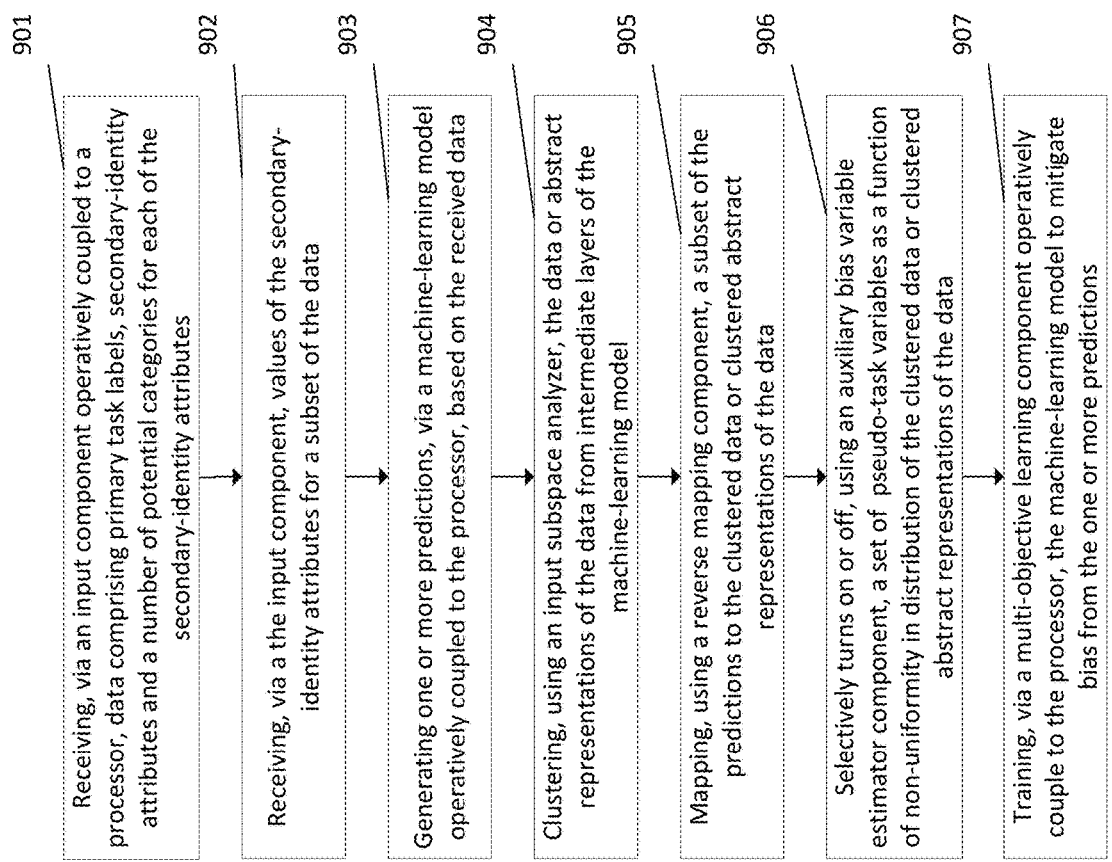
FIG. 9 illustrates a flow diagram of an example, non-limiting computer-implemented method that facilitates the mitigation of cognitive bias within a predictive system in accordance with one or more embodiments described herein.

Turning now to FIG. 9, presented is a flow diagram of a computer implemented method 900 that employs a processor operatively coupled to a memory that stores computer executable components to perform acts that facilitate the identification and mitigation of cognitive bias within an AI-based system in accordance with one or more embodiment described herein.

At 901, a system operatively coupled to a processor receives (e.g., via input component 130 operatively coupled to a processor 110) data comprising primary task labels 220, secondary-identity attributes 233 and a number of potential categories for the secondary-identity attributes. At 902, the system receives (e.g., via input component 130 operatively coupled to a processor 110) secondary-identity attribute values for a subset of the data. At 903, the system generates one or more predictions (e.g., via machine-learning model 150 operatively coupled to a processor 110) based on the received data. At 904, the system clusters (e.g., via input subspace analyzer 460 operatively coupled to a processor 110) the data or abstract representations of the data. At 905, the system maps (e.g., via reverse mapper component 470 operatively coupled to a processor 110) a subset of the predictions to the clustered data or clustered abstract representations of the data. At 906, the system selectively turns on or off (e.g., via auxiliary bias variable estimator component 480 operatively coupled to a processor 110) a set of pseudo-task variables as a function of non-uniformity in the distribution of the clustered data or clustered abstract representations of the data. At 907, the system trains (e.g., via a multi-objective learning component 140 operatively coupled to a processor 110) the machine-learning model 150 to mitigate bias from predictions.

Figure 10:
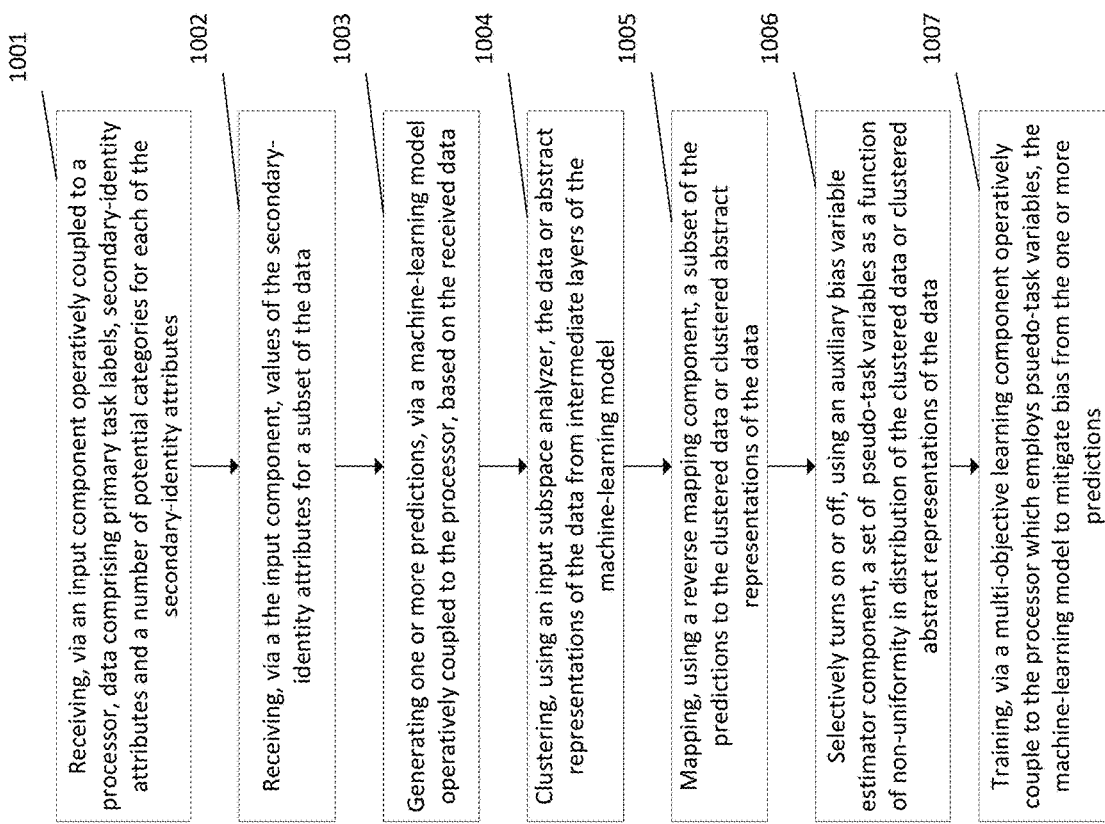
FIG. 10 illustrates a flow diagram of an example, non-limiting computer-implemented method that facilitates the mitigation of cognitive bias within a predictive system in accordance with one or more embodiments described herein.

Turning now to FIG. 10, presented is a flow diagram of a computer implemented method 1000 that employs a processor operatively coupled to a memory that stores computer executable components to perform acts that facilitate the identification and mitigation of cognitive bias within an AI-based system in accordance with one or more embodiment described herein.

At 1001, a system operatively coupled to a processor receives (e.g., via input component 130 operatively coupled to a processor 110) data comprising primary task labels 220, secondary-identity attributes 233 and a number of potential categories for one or more of the secondary-identity attributes. At 1002, the system receives (e.g., via input component 130 operatively coupled to a processor 110) secondary-identity attribute values for a subset of the data. At 1003, the system generates one or more predictions (e.g., via machine-learning model 150 operatively coupled to a processor 110) based on the received data. At 1004, the system clusters (e.g., via input subspace analyzer 460 operatively coupled to a processor 110) the data or abstract representations of the data. At 1005, the system maps (e.g., via reverse mapper component 470 operatively coupled to a processor 110) a subset of the predictions to the clustered data or clustered abstract representations of the data. At 1006, the system selectively turns on or off (e.g., via auxiliary bias variable estimator component 480 operatively coupled to a processor 110) a set of pseudo-task variables as a function of non-uniformity in the distribution of the clustered data or clustered abstract representations of the data. At 1007, the system employs pseudo-task variables to train (e.g., via a multi-objective learning component 140 operatively coupled to a processor 110) the machine-learning model 150 to mitigate bias from predictions.

Figure 11:
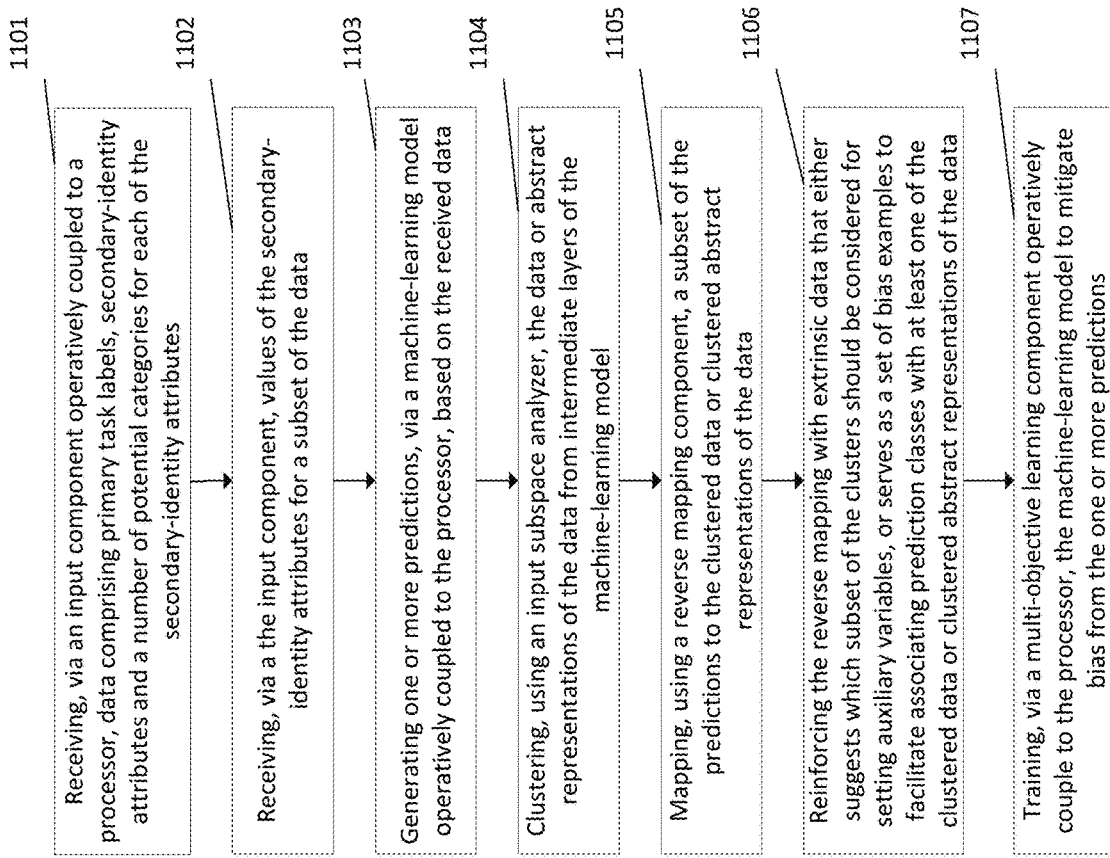
FIG. 11 illustrates a flow diagram of a computer implemented method that facilitates the identification and mitigation of cognitive bias within an AI-based system in accordance with one or more embodiments described herein.

Turning now to FIG. 11, presented is a flow diagram of a computer implemented method 1100 that employs a processor operatively coupled to a memory that stores computer executable components to perform acts that facilitate the identification and mitigation of cognitive bias within an AI-based system in accordance with one or more embodiment described herein.

At 1101, a system operatively coupled to a processor receives (e.g., via input component 130 operatively coupled to a processor 110) data comprising primary task labels 220, secondary-identity attributes 233 and a number of potential categories for the secondary-identity attributes. At 1102, the system receives (e.g., via input component 130 operatively coupled to a processor 110) secondary-identity attribute values for a subset of the data. At 1103, the system generates one or more predictions (e.g., via machine-learning model 150 operatively coupled to a processor 110) based on the received data. At 1104, the system clusters (e.g., via input subspace analyzer 460 operatively coupled to a processor 110) the data or abstract representations of the data. At 1105, the system maps (e.g., via reverse mapper component 470 operatively coupled to a processor 110) a subset of the predictions to the clustered data or clustered abstract representations of the data. At 1106, the system reinforces (e.g., via reverse mapper component 470 operatively coupled to a processor 110) the mapping with extrinsic data that either suggests which subset of the clustered data or clustered abstract representations of the data should be considered for setting pseudo-task variables or serves as a set of bias examples to facilitate associating prediction classes with at least one of the clusters of the clustered data or clustered abstract representations of the data. At 1107, the system trains (e.g., via a multi-objective learning component 140 operatively coupled to a processor 110) the machine-learning model 150 to mitigate bias from predictions.

Figure 12:
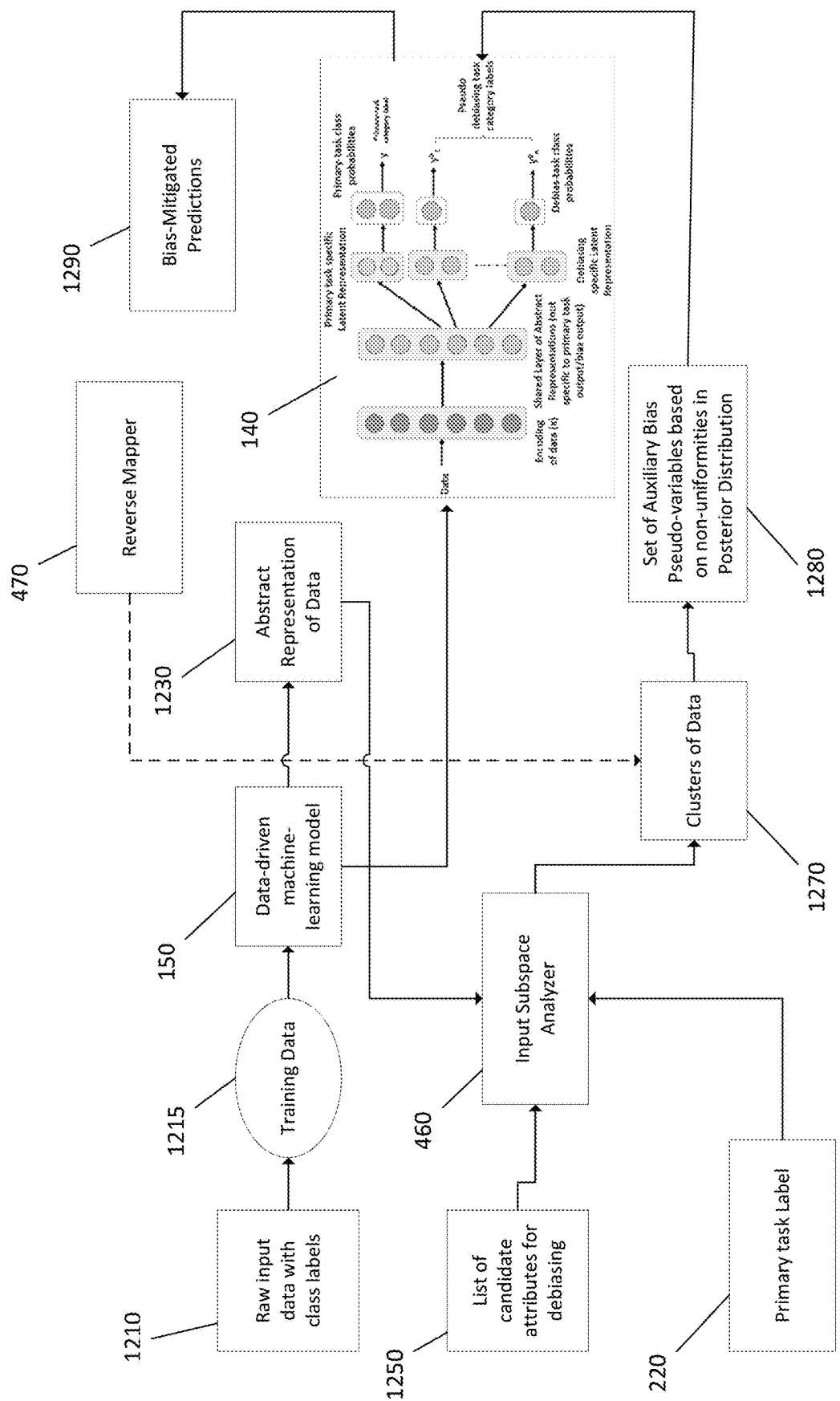
FIG. 12 illustrates a schematic of a method to mitigate bias in a predictive system, in accordance with one or more embodiments described herein.

FIG. 12, presented as a schematic of a method to mitigate bias in a predictive system. Raw data 1210, is used to create a training data set 1215, in order to train a machine-learning model 150. The machine-learning model 150 then outputs one or more predictions to the multi-objective learning component 140. The machine-learning model 150 also outputs the data or an abstract representation of the data 1230, to the input subspace analyzer 460. In an embodiment, the multi-objective learning component 140 can implement the neural network architecture 300, described more fully in FIG. 3. The input subspace analyzer 460 also takes as inputs a list of candidate secondary-identity attributes for debiasing 1250, and primary task labels 220. Using these inputs, the input subspace analyzer 460, clusters the data from the one or more predictions generated by the machine-learning model 150. At 1280, pseudo-task variables are set based on non-uniformities in the posterior distribution of the clusters. These variables are used by the multi-objective learning component 140 to set a debiasing task in order to train the machine-learning model 150. The multi-objective learning component 140 then outputs bias-mitigated predictions 1290, by training the machine-learning model 150 to perform well on the primary task, and poorly on the bias task (or inversely, well on the debiasing or fairness task).

Figure 13:
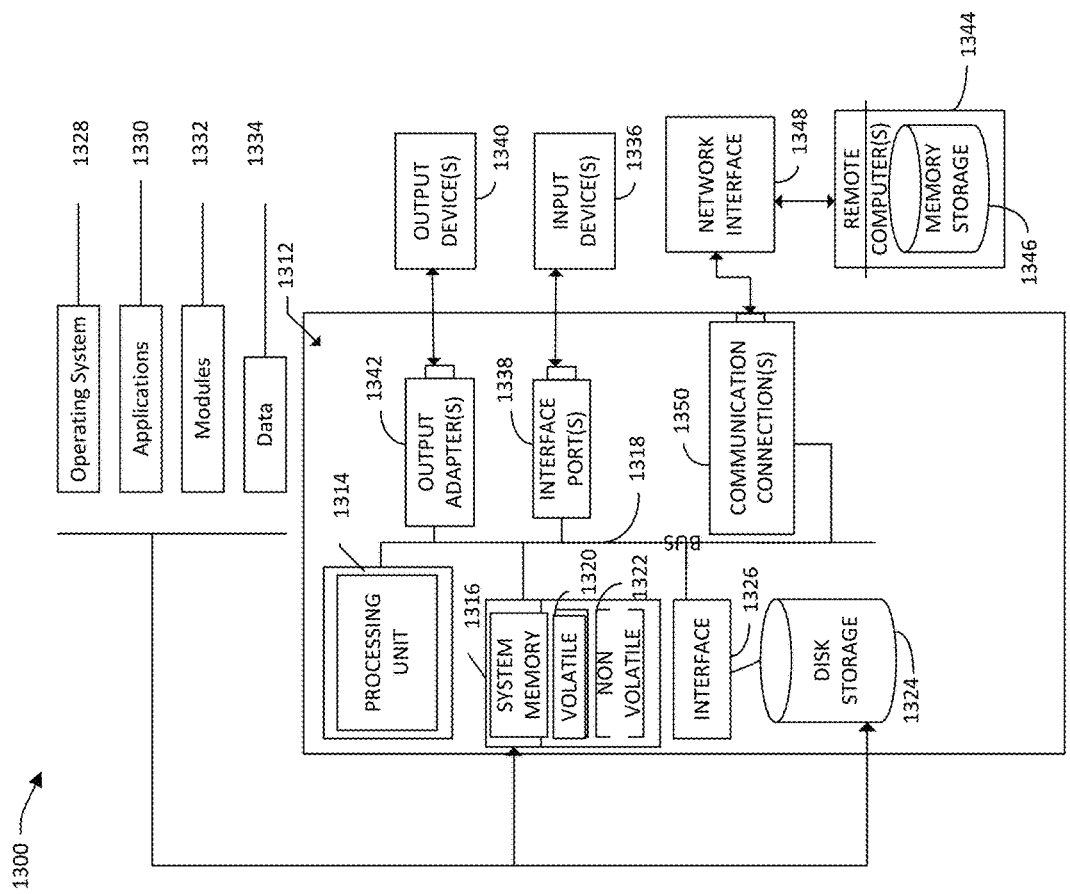
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity. With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/nonvolatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1300. Such software can also include, for example, an operating system 1328. Operating system 1328, which can be stored on disk storage 1324, acts to control and allocate resources of the computer 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
  a memory that stores computer executable components; and
  a processor that executes at least one of the computer executable components that:
    receives a set of data comprising data items, a primary classification task associated with the data items, primary task labels associated with the primary classification task, secondary-identity attributes associated with the data items, and respective categories for the secondary-identity attributes, wherein a machine learning model is trained to perform the primary classification task with primary task variables, and wherein the machine learning model has a structure comprising one or more layers associated with the primary classification task;

trains, using the set of data, the machine learning model to generate predictions with respect to the primary classification task associated with labeling the data items respectively with the primary task labels, and mitigate bias from the predictions, wherein the training comprises:
- generating, using the machine learning model and the set of data, one or more of the predictions for the primary classification task associated with labeling one or more of the data items respectively with the primary task labels,
- clustering, using a defined clustering process, the data items into clusters, wherein each cluster is associated with a distinct combination of the secondary-identity attributes and the respective categories of the secondary-identity attributes,
- identifying one or more secondary-identity attributes that have bias based on a function of non-uniformity in distribution of respective posteriors of the clusters and respective mappings of the one or more of the predictions to the clusters,
- generating one or more pseudo-task variables respectively associated with the one or more secondary-identity attributes that have the bias,
- generating a pseudo-bias classification task associated with the one or more pseudo-task variables for mitigating the bias from the predictions,
- modifying the machine learning model to concurrently perform the primary classification task and the pseudo-bias classification task, wherein the modifying comprise changing the structure of the machine learning model to comprise a first portion of the machine learning model associated with the primary classification task and primary task variables of the primary classification task, and second portion of the machine learning model associated with the pseudo-bias classification task and the one or more pseudo-task variables, and
- training, using a multi-objective loss function, the machine learning model to mitigate the bias from the predictions by concurrently generating, using the machine learning model, for each data item of the set of data:
  - a prediction with respect to the primary classification task associated with labeling the data item with one of the primary task labels at above a first defined performance threshold of the multi-objective loss function that increases classification effectiveness of the machine learning model for the primary classification task, and
  - one or more additional predictions for the data item with respect to the pseudo-bias classification task associated with the one or more pseudo-task variables at below a second defined performance threshold of the multi-objective loss function that reduces classification effectiveness of the machine learning model for the pseudo-bias classification task, wherein generating the one or more additional predictions at below the second defined performance threshold trains the machine learning model to mitigate the bias in the predictions associated with the one or more secondary-identity attributes determined to have the bias.

2. The system of claim 1, wherein the at least one of the computer executable components further receives values of the secondary-identity attributes for a subset of the data items.

3. The system of claim 1, wherein the identifying comprises mapping the one or more of the predictions to the clusters.

4. The system of claim 1, wherein the training further comprises selectively turning on or off at least one pseudo-task variable based on the function of the non-uniformity in the distribution of the respective posteriors of the clusters.

5. The system of claim 1, wherein the training further comprises employing extrinsic data to identify a subset of the clusters that should be considered for setting the one or more pseudo-task variables.

6. The system of claim 1, wherein the training further comprises setting the one or more pseudo-task variables by employing a threshold-based mechanism that is based on the function:

$$y_i^B(x) = \begin{cases} 1, & \frac{\mathbb{1}(y(x) \in P_s \wedge z_i \in U_i)}{\mathbb{1}(y(x) \in P_s)} > \tau \\ 0, & \text{otherwise} \end{cases}$$

wherein x is a data item that is assigned a primary task label, y (x) is the primary task label y assigned to the data item x, $P_s$ is a category for which the bias needs to be removed, $z_i$ is a particular category of an identity attribute, $U_i$ is a set of under-represented categories within $C_i$, $C_i$ is the categories of an $i^{th}$ identity attribute, and $\tau \in [0, 1]$.

7. The system of claim 1, wherein the multi-objective loss function comprises:

$$\mathcal{L} = P(y \mid x; \Theta_p, \Theta_s) - \sum_{i=1}^{n} P(y_i^B \mid x; \Theta_i^B, \Theta_s),$$

wherein $y_i^B$ is a pseudo-task variable, x is a data item that is assigned a primary task label, y is the primary task label, P is the primary task labels, k is a quantity of the primary task labels, $\Theta_p \in \mathbb{R}^{p \times k}, \Theta_i^B \in \mathbb{R}^{r \times 1}, \Theta_s \in \mathbb{R}^{d \times p}$, and d is a quantity of dimensions in a set of d-dimension real-valued vectors.

8. A computer-implemented method comprising:
receiving, via by a system operatively coupled to a processor, a set of data comprising data items, a primary classification task associated with the data items, primary task labels associated with the primary classification task, secondary-identity attributes associated with the data items, and respective categories for the secondary-identity attributes, wherein a machine learning model is trained to perform the primary classification task with primary task variables, and wherein the machine learning model has a structure comprising one or more layers associated with the primary classification task;
training, by the system, using the set of data, the machine learning model to generate predictions with respect to the primary classification task associated with the labeling the data items respectively with the primary task labels, and mitigate bias from the predictions, wherein the training comprises:
generating, using the machine learning model and the set of data, one or more of the predictions for the primary classification task associated with labeling one or more of the data items respectively with the primary task labels,
clustering, using a defined clustering process, the data items into clusters, wherein each cluster is associated with a distinct combination of the secondary-identity attributes and the respective categories of the secondary-identity attributes,
identifying one or more secondary-identity attributes that have bias based on a function of non-uniformity in distribution of respective posteriors of the clusters and respective mappings of the one or more of the predictions to the clusters,
generating one or more pseudo-task variables respectively associated with the one or more secondary-identity attributes that have the bias,
generating a pseudo-bias classification task associated with the one or more pseudo-task variables for mitigating the bias from the predictions,
modifying the machine learning model to concurrently perform the primary classification task and the pseudo-bias classification task, wherein the modifying comprise changing the structure of the machine learning model to comprise a first portion of the machine learning model associated with the primary classification task and primary task variables of the primary classification task, and second portion of the machine learning model associated with the pseudo-bias classification task and the one or more pseudo-task variables, and
training, using a multi-objective loss function, the machine learning model to mitigate the bias from the predictions by concurrently generating, using the machine learning model, for each data item of the set of data:
a prediction with respect to the primary classification task associated with labeling the data item with one of the primary task labels at above a first defined performance threshold of the multi-objective loss function that increases classification effectiveness of the machine learning model for the primary classification task, and
one or more additional predictions for the data item with respect to the pseudo-bias classification task associated with the one or more pseudo-task variables at below a second defined performance threshold of the multi-objective loss function that reduces classification effectiveness of the machine learning model for the pseudo-bias classification task, wherein generating the one or more additional predictions at below the second defined performance threshold trains the machine learning model to mitigate the bias in the predictions associated with the one or more secondary-identity attributes determined to have the bias.

9. The computer-implemented method of claim 8, wherein the receiving comprises receiving values of the secondary-identity attributes for a subset of the data items.

10. The computer-implemented method of claim 8, wherein the identifying comprises mapping the one or more of the predictions to the clusters.

11. The computer-implemented method of claim 8, wherein the training further comprises selectively turning on or off at least one pseudo-task variable based on the function of the non-uniformity in the distribution of the respective posteriors of the clusters.

12. The computer-implemented method of claim 10, wherein the training further comprises employing extrinsic data to identify a subset of the clusters that should be considered for setting the one or more pseudo-task variables.

13. The computer-implemented method of claim 8, wherein the training further comprises setting the one or more pseudo-task variables by employing a threshold-based mechanism that is based on the function:

$$y_i^B(x) = \begin{cases} 1, & \frac{\mathbb{I}(y(x) \in P_s \wedge z_i \in U_i)}{\mathbb{I}(y(x) \in P_s)} > \tau \\ 0, & \text{otherwise} \end{cases}$$

wherein x is a data item that is assigned a primary task label, y (x) is the primary task label y assigned to the data item x, $P_s$ is a category for which the bias needs to be removed, $z_i$ is a particular category of an identity attribute, Ui is a set of under-represented categories within $C_i$, $C_i$ is the categories of an $i^{th}$ identity attribute, and $\tau \in [0, 1]$.

14. The computer-implemented method of claim 8, wherein the multi-objective loss function comprises:

$$\mathcal{L} = P(y \mid x; \Theta_p, \Theta_s) - \sum_{i=1}^{n} P(y_i^B \mid x; \Theta_i^B, \Theta_s),$$

wherein $y_i^B$ is a pseudo-task variable, x is a data item that is assigned a primary task label, y is the primary task label, P is the primary task labels, k is a quantity of the primary task labels, $\Theta_p \in \mathbb{R}^{p \times k}, \Theta_i^B \in \mathbb{R}^{r \times 1}, \Theta_s \in \mathbb{R}^{d \times p}$, and d is a quantity of dimensions in a set of d-dimension real-valued vectors.

15. A computer program product comprising a computer readable storage medium having program instructions embodied therewith, the program instructions executable by a processor to cause the processor to:
receive a set of data comprising data items, a primary classification task associated with the data items, primary task labels associated with the primary classification task, secondary-identity attributes associated with the data items, and respective categories for the secondary-identity attributes, wherein a machine learning model is trained to perform the primary classification task with primary task variables, and wherein the machine learning model has a structure comprising one or more layers associated with the primary classification task;
train, using the set of data, the machine learning model to generate predictions with respect to the primary classification task associated with labeling the data items respectively with the primary task labels, and mitigate bias from the predictions, wherein the training comprises:
generating, using the machine learning model and the set of data, one or more of the predictions for the primary classification task associated with labeling one or more of the data items respectively with the primary task labels, clustering, using a defined clustering process, the data items into clusters, wherein each cluster is associated with a distinct combination of the secondary-identity attributes and the respective categories of the secondary-identity attributes, identifying one or more secondary-identity attributes that have bias based on a function of non-uniformity in distribution of respective posteriors of the clusters and respective mappings of the one or more of the predictions to the clusters, generating one or more pseudo-task variables respectively associated with the one or more secondary-identity attributes identified have the bias, generating a pseudo-bias classification task associated with the one or more pseudo-task variables for mitigating the bias from the predictions, modifying the machine learning model to concurrently perform the primary classification task and the pseudo-bias classification task, wherein the modifying comprise changing the structure of the machine learning model to comprise a first portion of the machine learning model associated with the primary classification task and primary task variables of the primary classification task, and second portion of the machine learning model associated with the pseudo-bias classification task and the one or more pseudo-task variables, and training, using a multi-objective loss function, the machine learning model to mitigate the bias from the predictions by concurrently generating, using the machine learning model, for each data item of the set of data:

a prediction with respect to the primary classification task associated with labeling the data item with one of the primary task labels at above a first defined performance threshold of the multi-objective loss function that increases classification effectiveness of the machine learning model for the primary classification task, and one or more additional predictions for the data item with respect to the pseudo-bias classification task associated with the one or more pseudo-task variables at below a second defined performance threshold of the multi-objective loss function that reduces classification effectiveness of the machine learning model for the pseudo-bias classification task, wherein generating the one or more additional predictions at below the second defined performance threshold trains the machine learning model to mitigate the bias in the predictions associated with the one or more secondary-identity attributes determined to have the bias.

16. The computer program product of claim 15, wherein the identifying comprises mapping the one or more of the predictions to the clusters.

17. The computer program product of claim 15, wherein the training further comprises selectively turning on or off at least one pseudo-task variable based on the function of the non-uniformity in the distribution of the respective posteriors of the clusters.

18. The computer program product of claim 15, wherein the training further comprises employing extrinsic data to identify a subset of the clusters that should be considered for setting the one or more pseudo-task variables.

19. The computer program product of claim 15, wherein the training further comprises setting the one or more pseudo-task variables by employing a threshold-based mechanism that is based on the function:

$$y_i^B(x) = \begin{cases} 1, & \frac{\mathbb{1}(y(x) \in P_s \wedge z_i \in U_i)}{\mathbb{1}(y(x) \in P_s)} > \mathcal{T} \\ 0, & \text{otherwise} \end{cases}$$

wherein x is a data item that is assigned a primary task label, y (x) is the primary task label y assigned to the data item x, $P_s$ is a category for which the bias needs to be removed, $z_i$ is a particular category of an identity attribute, $U_i$ is a set of under-represented categories within $C_i$, $C_i$ is the categories of an $i^{th}$ identity attribute, and $\tau \in [0, 1]$.

20. The computer program product of claim 15, wherein the multi-objective loss function comprises:

$$\mathcal{L} = P(y|x; \Theta_p, \Theta_s) - \sum_{i=1}^{n} P(y_i^B | x; \Theta_i^B, \Theta_s),$$

wherein $y_i^B$ is a pseudo-task variable, x is a data item that is assigned a primary task label, y is the primary task label, P is the primary task labels, k is a quantity of the primary task labels, $\theta_p \in \mathbb{R}^{p \times k}, \theta_i^B \in \mathbb{R}^{r \times 1}, \theta_s \in \mathbb{R}^{d \times p}$, and d is a quantity of dimensions in a set of d-dimension real-valued vectors.

* * * * *